March 14, 1967  J. R. GUINGAND  3,309,073
APPARATUS FOR HEAT TREATING SPOOLS OF OPEN-WOUND METAL STRIP
Filed March 4, 1963  2 Sheets-Sheet 1

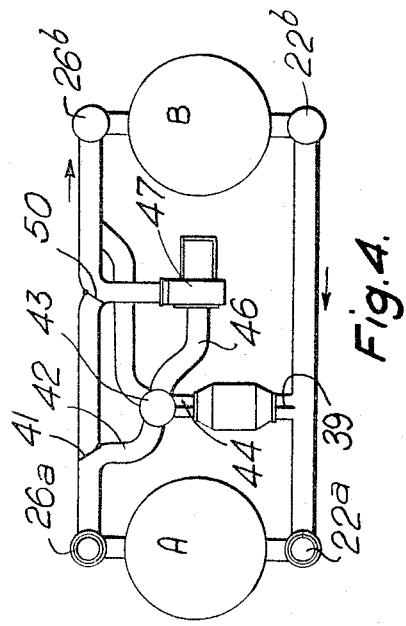
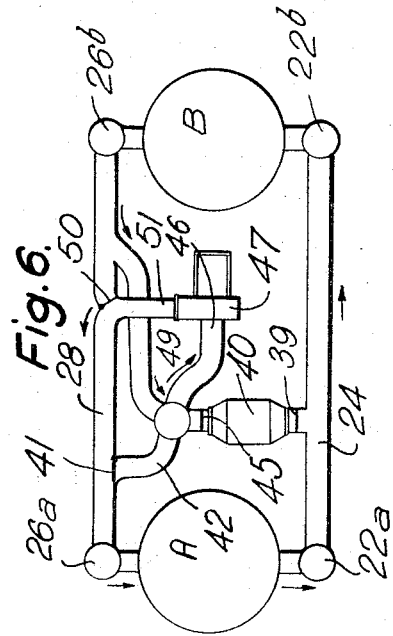
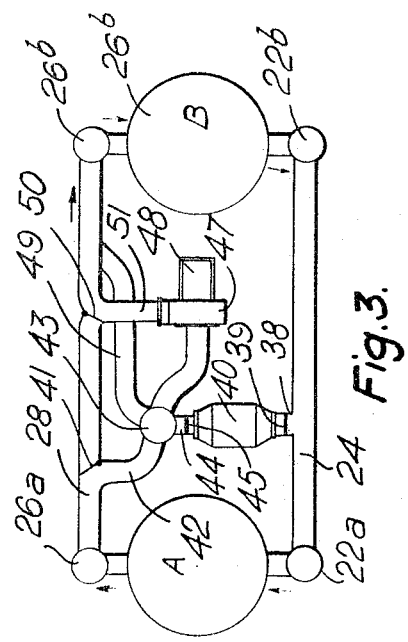
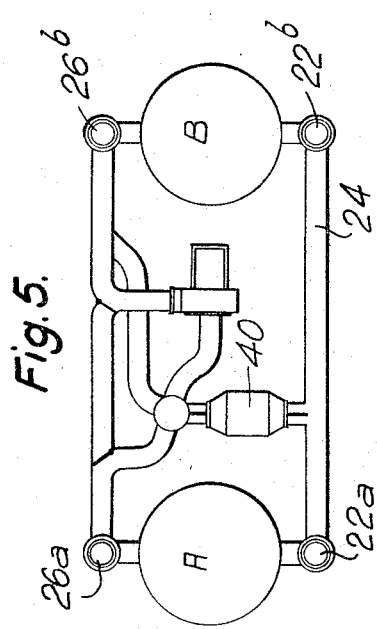

United States Patent Office 3,309,073
Patented Mar. 14, 1967

3,309,073
APPARATUS FOR HEAT TREATING SPOOLS OF OPEN-WOUND METAL STRIP
Jean Raymond Guingand, Paris, France, assignor to Société Anonyme Heurtey, Paris, France
Filed Mar. 4, 1963, Ser. No. 262,576
Claims priority, application France, Mar. 14, 1962, 890,981, Patent 1,325,011
6 Claims. (Cl. 266—5)

The heat treatment of spools of open-wound metal strip allows for improving the quality and rapidity of the operations by the active circulation of atmosphere gases through the gaps separating the turns. This circulation is usually obtained by placing a spool with its end section on a hearth of the open-work or ribbed type and by circulating the atmosphere gas with convenient ventilation means between the turns and collecting the gas at the opposite end and then streaming it through the central chimney of the spool.

Attempts have already been made to recover the heat of a hot spool to permit heating without cost of a spool just charged into the furnace, by providing communications between a space containing a hot spool and a space containing a cold spool.

Examples of installations permitting such heat recoveries are described in the specification of, and in the drawings accompanying, the French patent Ser. No. 1,266,520 filed by the applicant on May 30, 1960.

However, the heat transfer between the hot gases and the cold spool and between the cold gases and the hot spool during such operations are so active that the horizontal faces of the different spools display temperature differences detrimental to the quality of the end product.

It is an object of this invention to overcome these drawbacks.

The invention is directed to heat treating spools of open-wound metal strip, by recovering heat from one or more hot spools contained in a cell and transferring the same to one or more spools to be heated contained in another cell, and wherein the atmosphere in such a cell is recycled and an atmosphere gas is simultaneously drawn off and injected into the recycling circuit.

An embodiment of the invention comprises manifolds provided with restricted and calibrated orifices for the injection and extraction in at least two treatment cells each of which contains at least one open-wound spool, circulation means for providing high-activity recycling in each of said cells and means for interconnecting said cells.

In a preferred embodiment, such an apparatus comprises, in each cell, reversible ventilation means preferably consisting of helical blowers with contra-rotating propellers.

The interconnections referred to preferably comprise a centrifugal circulating blower, in conjunction with means for distributing and directing gas streams such that the blower intake be always effected on the side from which the coolest gases originate.

Said interconnection means are furthermore designed to permit the insertion, into a circuit closing on to one cell, of at least one heat exchanger preferably of the cooling type utilized to complete cooling subsequent to recovery.

The description which follows with reference to the accompanying drawings, which are filed by way of example and not of limitation, will give a clear understanding of how the invention can be carried into practice.

Referring to the drawings filed herewith:
FIG. 1 is a cross-sectional view of a cell in such an installation;

FIGS. 3 through 6 illustrate the various forms of communications between the cells, the circulating blower and the heat exchanger for providing alternating recovery processes.

Figure 1:
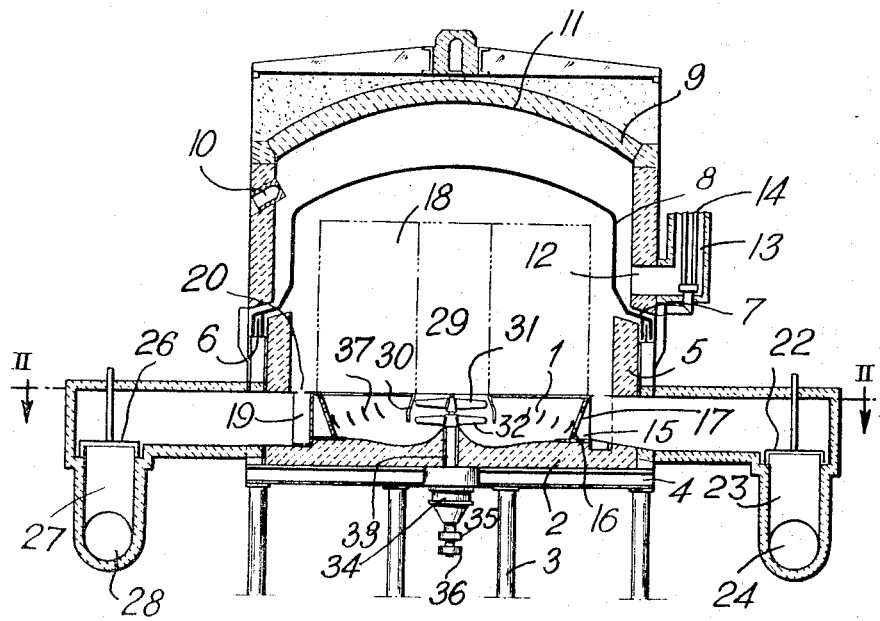
Figure 2:
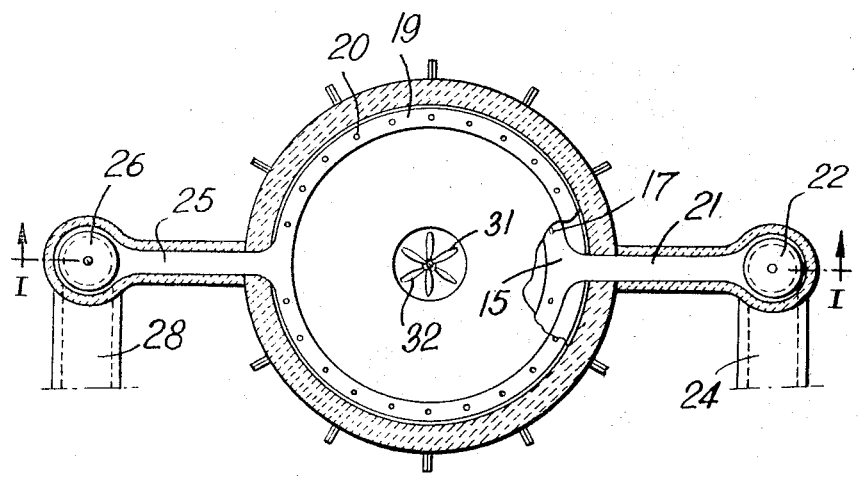
FIG. 2 is a sectional view taken on the line II—II of FIG. 1.

The heat treatment cell illustrated is substantially of the same type as those described in the specification of, and in the drawings accompanying, the French patent Ser. No. 1,271,590, filed on Aug. 1, 1960, this specific example having been adopted by reason of its simplicity in installations of the more inexpensive type, although it will of course be understood that the description which follows is by no means limited to this type of cell but that it extends to all furnaces in which spools of open-wound metal strips can be treated.

As is clearly shown in FIG. 1, such a cell comprises a charging plate 1 with radiating braces resting upon an insulating hearth 2 supported on columns 3 through a platform 4. Above the charging plate is provided a small refractory wall 5 surrounded by one of the elements 6 of a seal, the other element of said seal being provided on the rim 7 of a protective cover 8.

Said cover is surmounted by a heating bell 9 acting as a reflector, which bell is provided in its skirt with burners 10 directed towards the roof 11 and is equipped with a bottom smoke discharge orifice 12 opening into a recuperator 13 in the cluster 14 from which circulate the fuel and oxidant feeding the burners 10.

Over the periphery of the ribs on plate 1 is formed an annular channel 15 of which the inner frusto-conical wall 16 is provided with calibrated holes 17 opening between the successive ribs supporting the open-wound spool 18 to be treated. A second annular conduit 19 surrounds the first conduit. The section of conduit 19 is substantially rectangular and its upper wall is provided with regularly spaced calibrated holes 20 opening at the perimeter of the base of spool 18, between said base and the inner face of wall 5.

Annular conduit 15, which traverses conduit 19 through a radial outlet 21, opens through a lifting-flap valve 22 equipped with a suitable seal, in the vertical branch 23 of an intercommunication duct 24. Similarly, annular conduit 19 is connected to a radial outlet 25 which opens via a similar lifting-flap valve 26, in the vertical branch 27 of intercommunication duct 28.

The central part of the charging plate 1 is provided, beneath the central hollow space 29 of spool 18, with a barrel-plate 30 surrounding and spaced from the tips of the blades 31 and 32 of two contra-rotating propellers driven by concentric shafts 33 supported in a sealed housing 34. Pulleys 35 and 36 are coupled in driven relation, through suitable belts, to one or more reversible motors (not shown) and transmit the rotation to the two propellers.

Alternating with the ribs on the charging plate 1 are furthermore disposed peripheral and staged vanes 37 for deflecting the gas streams, which vanes follow the bottom 2 in a vertical direction parallel with the straight generating lines of the turns on spool 18.

Such an installation comprises at least one pair of cells fitted in identical fashion.

As may be seen from FIG. 3, there are associated with a cell A of the aforementioned type, two flap-valves 22a and 26a which are respectively placed in communication with ducts 24 and 28, which ducts lead up to corresponding similar valves 22b and 26b of a cell B of the same type.

Duct 24 is connected, via a tap 38 provided with a disc 39, to a cooler 40.

In the duct 28 is a switching butterfly-valve 41 which, when said duct 28 is closed, uncovers, or when said duct is opened, covers, a tap 42 leading to a four-way distributor 43.

One of these four ways, 44, leads to a heat exchanger 40 and incorporates a disc 45.

Another way, 46, leads to the intake port of a centrifugal blower 47 driven by a motor 48. A further way 49 connects distributor 43 to duct 28, between valve 26b and a switching butterfly-valve 50 which is provided on said duct 28 close to the tap 51 connecting duct 28 to the delivery end of blower 47. Said butterfly-valve 50 is adapted to channel the fluid delivered by blower 47 towards valve 26a or towards valve 26b.

The apparatus hereinbefore described operates as follows:

If propellers 31 and 32 are rotating, they draw in gas through chimney 29 and deliver it between the turns of spool 18. Conversely, when the direction of rotation is reversed, delivery takes place through the chimney and suction between the spool turns. The internal recycling process can thus be subjected to alternations that ensure great temperature uniformity, particularly with respect to the upper and lower end faces of the spools.

Though the medium of manifolds 15 and 19, the orifices 17 and 20 permit limited suctions or deliveries from or into the recycling circuit, irrespective of the direction of rotation thereof, it being of course understood that the flow originating from the internal recycling and that from the external blower reach the entrance to the spool along substantially parallel paths and in the same direction.

The choice of a recycling blower of the helical type with contra-rotating propellers is dictated by mechanical and aerodynamic considerations alike, so as to ensure the desired circulation inside the cell.

As may be seen in FIG. 3, by opening discs 22a, 22b and 26a, 26b and by so disposing distributor 43 that communication be established between the tap 42 and the intake port of blower 47, discs 39 and 45 are caused to isolate exchanger 40; similarly, butterfly-valves 41 and 50 isolate the section of duct 28 which separates them; a cold spool to be heated placed within a cell A will be heated by a hot spool placed in cell B. Blower 47 operates at a pressure such that, notwithstanding the action of the helical blowers operating in the recycling mode in said cells, there is drawn in, for instance through orifices 17 of manifold 15 of cell B, a portion of the heated gases (at the expense of the spool contained therein) which is then injected through the companion manifold and holes into the recycled-gas circuit of the cold spool contained in cell A, thereby warming the latter. Similarly, through the orifices 20 of manifold 19 of cell A, it is possible to draw off a fraction of the relatively cold gases and introduce them, by means of blower 47 and the companion holes and manifold, into the recycling circuit of cell B.

Since the recycling processes tend to sustain the temperature uniformity in both these two cells, the charge in cell B is uniformly cooled and the charge in cell A uniformly heated without undue temperature differences being noted, even between horizontal faces that are remote in the spools.

When the temperatures of the charges have become equal, the discs 22a and 26a are closed and the charge in isolated cell A is subjected to heating by lighting the burners. This heating process is uniformly effected and maintained by the continuous recycling effected during operation in cell A, in conjunction with the reversals of the direction of circulation.

During this heating period (see FIG. 4), valves 41 and 50 are left in position but discs 39 and 45 are opened and distributor 43 establishes communication between conduits 44 and 46 while at the same time isolating conduits 42 and 49.

The charge in cell B is thus subjected to forced cooling since blower 47 sucks in the gas circulating in cell B through exchanger 40 and delivers it into the cell after it has been energetically cooled.

At the end of the forced cooling period, while cell A is being heated or maintained in the steady state, with discs 22a and 26a closed, cell B is opened to permit the treated and cooled charge to be drawn and replaced by a fresh charge. This operational phase is schematically illustrated in FIG. 5.

Reference is now had to FIG. 6, which shows the subsequent phase that takes place immediately after this substitution has been effected, cell B being covered with its heating bell. Discs 22a and 26a are opened and distributor 43 is placed in a position such that conduits 49 and 46 intercommunicate. Valve 50 is positioned so that conduit 28 no longer leads to disc 26b but delivery conduit 51 of blower 47 is placed in communication with the space surrounding disc 26a. Valve 41 closes the orifice of conduit 42, while discs 39 and 45 are closed to isolate heat exchanger 40.

These various operations make it possible to draw through blower 47 a fraction of the gas contained in the cell B to be heated and to inject this gas into the cell A which is now to be cooled, with blower 47 operating solely on this relatively cold gas. The hot gas expelled from cell A is directed through conduit 24 towards cell B which is now to be heated.

These various dispositions are extremely simple and appertain to a pair of cells that can be heated by means of burners; however, they can also be applied to cells heated by radiating tubes, electrical resistances or other convenient means, under conditions such that covers for protecting the charges may prove unnecessary.

In the example illustrated, only one forced-cooling heat exchanger is provided for, but it will of course be understood that the heating can if necessary be obtained with a generator constituting another exchanger. A plurality of exchangers of each type operating at various temperatures could alternatively be provided.

With a view to carrying the recovery process still further, a larger number of cells could be joined by more complex interconnections that are adapted to successively connect the cells to be heated with a cell to be cooled, thereby taking advantage each time of the remaining heat until the successive temperature equalizations are achieved while at the same time ensuring ready compliance with the imperatives of handling and also with the requirements set, among other things, by such stringent operating times as the temperature holding time.

Similarly, for ease of handling, a multiplicity of pairs of cells may be disposed at regularly spaced intervals in a circle, one of these positions being assigned to a spool loading and unloading station. A system of this type may be associated with a slewing hoist, a hoisting arm, a crane, or a transporter for handling the heating bells and the spools, which are adapted to revolve about the center of said circle.

It is to be clearly understood that many other modifications can be made to the specific embodiments hereinbefore described, without departing from the scope of the invention, as defined in the appended claims.

What I claim is:

1. Apparatus for heat treating open coils of metal strips in individual cells comprising, at least a pair of cells, heating means externally disposed with respect to each cell for supplying heat thereto, a pair of manifolds in each cell having orifices opening thereinto, said orifices being situated in the vicinity of respective spaces through which a gas can be internally circulated in said cell, ventilating means for internally circulating said gas in said spaces and through the turns of said open coils, and conveying means between each pair of said cells, said conveying means comprising a duct system and a blower fan having both inlet and outlet connections in said duct system, said duct system comprising, for each manifold of one cell, a connecting duct to a corresponding manifold of a second cell, one of said ducts including two branch portions for conveying gas from said one duct, a distributor coupled to said branch portions for receiving gas therefrom, said distributor being further connected to the inlet of the fan, a further branch portion coupled to the outlet of the fan and said one duct at a location between the first said two branch portions, said distributor controlling flow of gases between said branch portions and said fan, a first valve at the junction between the first branch portion and said one connecting duct and a second valve at the junction between the further branch portion and said one connecting duct.

2. Apparatus as claimed in claim 1, wherein said ventilating means is constituted by a reversible helical type blower.

3. Apparatus as claimed in claim 2, wherein said ventilating means is constituted by a reversible helical type blower having two contra-rotating propellers.

4. Apparatus as claimed in claim 1, wherein said blower fan is a centrifugal blower.

5. Apparatus as claimed in claim 1, wherein said conveying means includes a heat exchanger between the distributor and the other of said ducts.

6. Apparatus as claimed in claim 5 comprising inlet and outlet valves for said heat exchanger respectively disposed between the heat exchanger and said other duct and the distributor.

References Cited by the Examiner

UNITED STATES PATENTS

| | | | |
|---|---|---|---|
| 1,536,944 | 5/1925 | Steenstrip | 29—487 |
| 1,727,192 | 9/1929 | Baily | 266—5 |
| 2,180,376 | 7/1937 | Vaughn | 148—16 |
| 2,630,315 | 3/1953 | Munford | 266—5 |
| 3,109,877 | 11/1963 | Wilson | 266—5 |

FOREIGN PATENTS 1,266,520  6/1961  France.

JOHN F. CAMPBELL, *Primary Examiner.*

DAVID L. RECK, *Examiner.*

O. MARJAMA, L. J. WESTFALL, *Assistant Examiners.*